(12) United States Patent
Dolotallas et al.

(10) Patent No.: US 12,448,072 B2
(45) Date of Patent: Oct. 21, 2025

(54) MULTI-POSITION AND ORIENTATION SADDLE ATTACHMENT DEVICE

(71) Applicant: Noel Dolotallas, Vancouver (CA)

(72) Inventors: Noel Dolotallas, Richmond (CA); Colin Anderson, North Vancouver (CA)

(73) Assignee: Noel Dolotallas, Richmond (CA)

( * ) Notice: Subject to any disclaimer, the term of this patent is extended or adjusted under 35 U.S.C. 154(b) by 127 days.

(21) Appl. No.: 18/268,601

(22) PCT Filed: Dec. 21, 2021

(86) PCT No.: PCT/CA2021/051860
§ 371 (c)(1),
(2) Date: Jun. 20, 2023

(87) PCT Pub. No.: WO2022/133597
PCT Pub. Date: Jun. 30, 2022

(65) Prior Publication Data
US 2024/0043082 A1 Feb. 8, 2024

Related U.S. Application Data

(60) Provisional application No. 63/129,405, filed on Dec. 22, 2020.

(51) Int. Cl.
*B62J 1/08* (2006.01)
(52) U.S. Cl.
CPC .................................. *B62J 1/08* (2013.01)

(58) Field of Classification Search
CPC ................... B62J 1/08; B62J 1/04; B62J 1/10
See application file for complete search history.

(56) References Cited

U.S. PATENT DOCUMENTS

| 4,568,121 | A | * | 2/1986 | Kashima | ................... B62J 1/08 |
| | | | | | 297/215.15 |
| 5,988,741 | A | | 11/1999 | Voss et al. | |
| 6,164,864 | A | | 12/2000 | Beach et al. | |

(Continued)

FOREIGN PATENT DOCUMENTS

| CN | 2298189 | 9/1998 |
| EP | 0542650 | 5/1993 |

(Continued)

*Primary Examiner* — Shin H Kim
(74) *Attorney, Agent, or Firm* — Palmer IP Inc.

(57) ABSTRACT

A novel multi-position and orientation bicycle saddle attachment device allowing a cyclist to toggle between a plurality of fixed saddle angle positions in immediate response to changes in trail or road gradients without the need to dismount or use any tools. The disclosed device includes a base assembly offering a first rotational adjustment setting, and a fore and aft slidable saddle adjustment mechanism, and a second rotational saddle adjustment, comprised of a lever assembly and a pair of rotatable swingarm assemblies configured to clamp and hold a bicycle saddle by its rails. A base assembly portion of the multi-position and orientation saddle attachment device is fixed to a bicycle seatpost by mounting hardware. The novel multi-position and orientation saddle attachment device is designed to be retrofittable and may be configured to a plurality of bicycle saddles, and a plurality of bicycle seatposts.

18 Claims, 21 Drawing Sheets

(56) References Cited

U.S. PATENT DOCUMENTS

| | | | |
|---|---|---|---|
| 6,799,773 B2* | 10/2004 | Kao | B62J 1/08 280/281.1 |
| 7,559,603 B1* | 7/2009 | Chiang | B62J 1/08 297/215.14 |
| 7,559,604 B2* | 7/2009 | Beaulieu | B62J 1/08 297/215.14 |
| 7,621,595 B1* | 11/2009 | Chen | B62J 1/08 297/215.14 |
| 7,997,603 B2 | 8/2011 | Petrie | |
| 8,398,107 B2 | 3/2013 | McAinsh | |
| 8,485,597 B2 | 7/2013 | Kim | |
| 8,905,473 B2 | 12/2014 | Hsu et al. | |
| 10,144,469 B2 | 12/2018 | Marui | |
| 10,179,622 B2 | 1/2019 | Hermansen et al. | |
| 10,399,625 B2 | 9/2019 | Hwang | |
| 10,710,662 B2* | 7/2020 | Bowers | B62K 3/02 |
| 2006/0006707 A1* | 1/2006 | Lin | B62J 1/08 297/215.14 |
| 2006/0152045 A1 | 7/2006 | Okajima et al. | |
| 2007/0262623 A1* | 11/2007 | Fortt | B62J 1/08 297/215.13 |
| 2009/0179467 A1* | 7/2009 | Chiang | B62J 1/08 297/215.13 |
| 2009/0218857 A1* | 9/2009 | Ochendalski | B62J 1/08 297/215.15 |
| 2011/0241390 A1* | 10/2011 | Tsai | B62J 1/08 297/215.15 |
| 2012/0139207 A1* | 6/2012 | Ferreira | B62J 1/08 280/287 |
| 2013/0093223 A1 | 4/2013 | Kim | |
| 2016/0075389 A1* | 3/2016 | Ahnert | F16C 11/04 403/54 |
| 2016/0237020 A9 | 8/2016 | Han et al. | |
| 2016/0267372 A1* | 9/2016 | Imaizumi | H01Q 9/285 |
| 2018/0334210 A1 | 11/2018 | Choltco-Devlin et al. | |
| 2019/0016402 A1 | 1/2019 | Huang | |

FOREIGN PATENT DOCUMENTS

| | | |
|---|---|---|
| EP | 1394027 A2 | 1/2007 |
| EP | 3042833 | 7/2016 |
| FR | 1233121 A | 10/1960 |
| FR | 2790438 A1 | 9/2009 |
| JP | 2007-62597 | 3/2007 |
| JP | 4195334 | 12/2008 |
| JP | 2016-168893 | 9/2016 |
| KR | 100981994 B1 | 9/2010 |
| WO | WO2016171532 A1 | 10/2016 |
| WO | WO2019140535 A1 | 7/2019 |

* cited by examiner

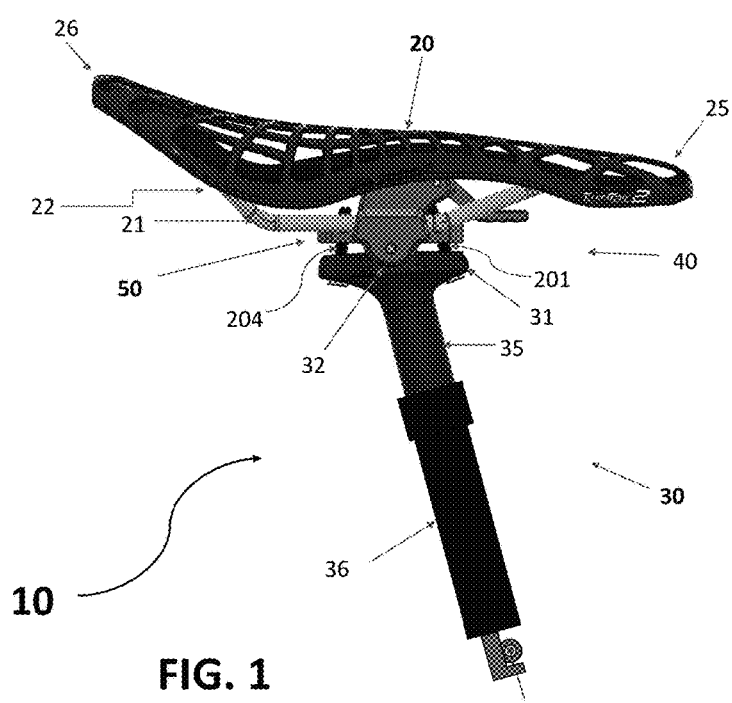
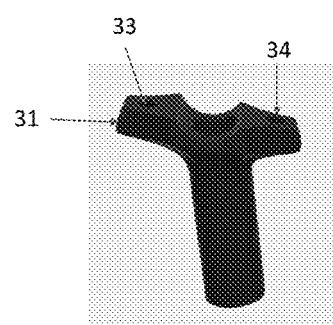
FIG. 1
FIG. 1a

FIG. 6     "Saddle Repositioning Mechanism" 52 includes: 53, 70, and 110 inclusive

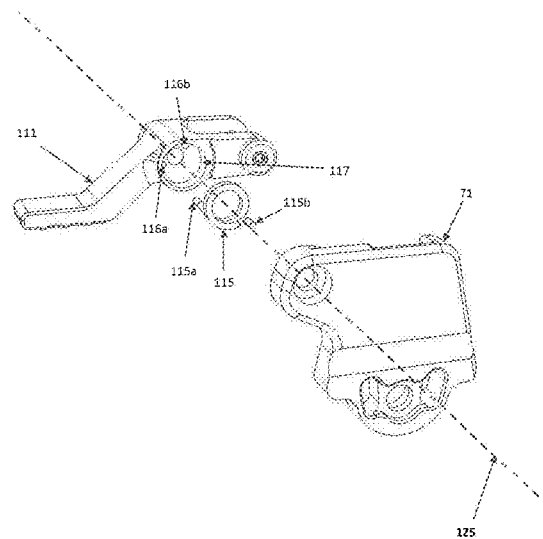 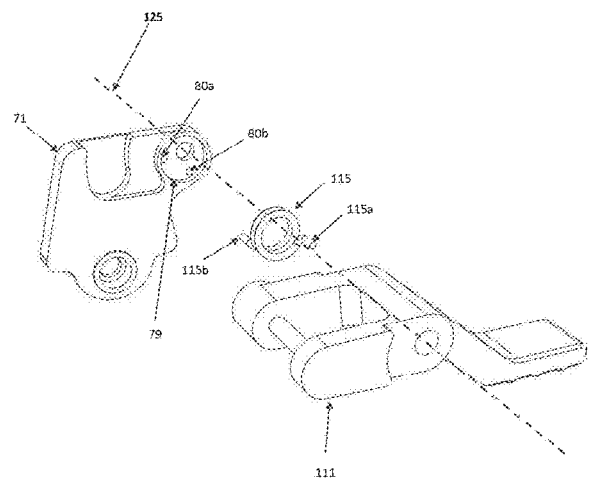
FIG. 7a
FIG. 7b

Not drawn to proportion

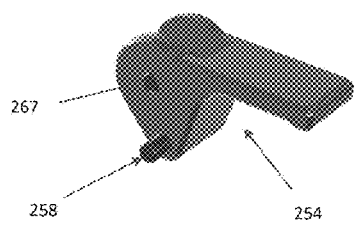
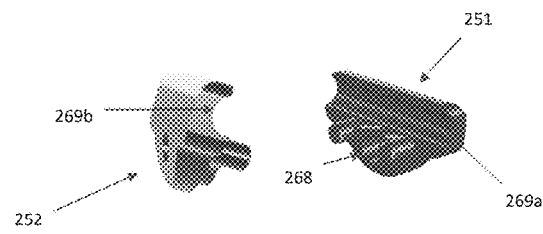
FIG. 19c  FIG. 19d

Scenario:
1. User (cyclist) is in a moving state on relatively flat terrain, pedaling forward on a bicycle.
2. User encounters a change in grade, either inclining or declining.
3. User must then decide a course of action, beginning at Action A, and ending with Action D.

Assumptions:
1. The seatpost is fixed in a relatively vertical position.
2. The saddle positioning clamping assembly is oriented with the lever facing forward.
3. The starting position for the saddle positioning clamping assembly is set in the middle index slot for flat terrain.

FIG. 20

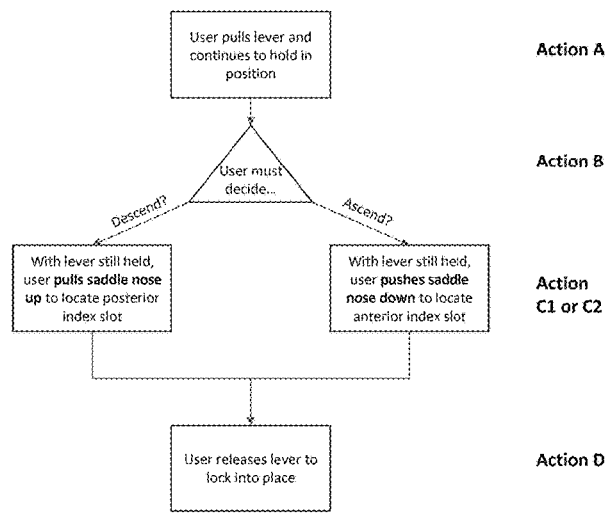

User has option to install and run the lever facing forward or rearward

Rear-facing lever

Direction of travel →

Front-facing lever

Direction of travel →

MULTI-POSITION AND ORIENTATION SADDLE ATTACHMENT DEVICE

PRIORITY DOCUMENT

The present application claims priority from U.S. Provisional Patent Application No. 63/129,405 titled "MULTI-POSITION SADDLE ATTACHMENT DEVICE" and filed on Dec. 22, 2020.

FIELD OF THE INVENTION

In one of its aspects, the present disclosure relates to a device for attaching a bicycle saddle to a seatpost, more specifically, a device providing the ability for a saddle to be readjusted into a variety of orientations as needed while riding a bicycle.

BACKGROUND

Bicycle paths consist of changing elevations and gradients, featuring flat, uphill, and downhill sections. When climbing, it is advantageous to position or orient a bike saddle with its nose tilted down and rear upwards which helps provide a stable platform from which to generate power and maintain an efficient pedaling cadence. In the context of this disclosure, to position or to orient a saddle refers to setting the overall pose of the seat or saddle, and the terms are used interchangeably herein. This saddle position helps to counter the effects of a steep grade, increases rear tire traction, and applies weight to the front wheel to prevent tipping up or flipping over. When descending, it is beneficial to tilt the saddle's nose upwards and rear downwards—as can be seen on professional downhill race bikes—effectively moving the saddle out of the way which creates more space for one to maneuver and reposition one's body while navigating steep slopes or managing obstacles. For long flat stretches of road and undulating terrain, it is beneficial to position or orient the saddle flat for improved comfort.

To some extent the advent of dropper seatposts have introduced on-demand adjustability for saddle positions, however, movement is limited only to vertical adjustments which is just a partial solution. Additionally, while raising one's saddle helps with leg extension and leverage, steep climbing grades tend to move a rider's center of mass rearward and over the rear axle which negatively affects climbing ability due to unweighting of the front wheel. Consequently, this effect then initiates a struggle between finding balance and generating power which, ultimately, leads to rider fatigue.

The current state of bicycle seatposts—used to attach a saddle to a frame—feature a rail clamp assembly consisting of an upper and lower plate to hold a saddle in place. This fixed position, however, greatly limits a rider's ability to make trailside adjustments on-the-fly which, as outlined above, would be beneficial for improved performance, comfort, and safety when navigating ever changing path elevations and grades.

Adjusting a bicycle saddle is possible by manipulating the rail clamp assemblies, but this is a cumbersome and lengthy process requiring a cycle of trial and error until desired results are achieved. Due to the limited space with which to work, the process requires extreme dexterity and patience so as not to lose any small parts of the assembly and to correctly fasten bolts according to proper and safe torque specifications. Additionally, to adjust a bike saddle and associated rail clamp assembly requires specialized tools, usually a hexagonal key or torx head key, and a torque wrench which many riders often do not carry with them while riding. Further, adjusting a saddle requires that a cyclist be dismounted and that the bicycle is not in motion. For the above noted reasons, the vast majority of cyclists are resigned to leaving their saddle position in one fixed setting: either nose-up, substantially flat, or nose-down, and simply settle on riding in a compromised fashion which may lead to complications down the road.

Further, because of the above-noted cumbersome nature of saddle adjustments, cyclists who choose to leave their saddles with the nose pointing downwards may experience increased pressure on their palms and discomfort on their shoulders. Another negative effect of a keeping a saddle fixed in a nose-down position is it produces the sensation of sliding forward and 'off' the nose of the saddle which may lead to fatigue as one struggles to maintain proper riding position. In others, the described saddle position has been linked to back pain, while there are also cases of prostate related complications among male cyclists.

Additionally, having a fixed saddle position has been linked to groin and pelvic related ailments. Many male and female cyclists experience pain, numbing, and general discomfort in sensitive soft-tissue areas caused by increased pressure on the perineum when contact is made with a bicycle saddle, especially over long rides or climbs or combinations thereof where a rider is seated for long periods of time. Relatedly, and within the same general context, many cyclists experience 'saddle sores' or skin irritations. Likely the most common side effect of spending long stretches perched on a saddle is pain experienced on one's 'sit bones' or ischial tuberosity. The above noted ailments may be relieved by the ability to adjust one's saddle periodically as a form of prevention.

Based on the summary of effects, a novel solution is needed to overcome the several shortcomings and disadvantages of today's current state of seatpost saddle rail clamping technology.

BRIEF SUMMARY

The present invention is a novel multi-position and orientation bicycle saddle attachment device that allows a cyclist to adjust the angle of a saddle on-demand or "on-the-fly" without needing any tools, and without the need to stop or dismount. In one example, the inventive disclosure features rotatable swingarms that can be locked and unlocked using a lever, held into a variety of fixed positions by a locking mechanism, such as a lock shaft, fitted into correspondingly configured engagement device, such as indexed slots. The indexed slots provide on-demand adjustability enabling a cyclist to reposition a saddle, as and when needed, to improve efficiency, performance, and comfort, whether climbing, descending, or travelling long distances on a bicycle, or other similarly constructed transportation devices.

According to a first aspect of the disclosure, there is provided an embodiment of a multi-position and orientation bicycle saddle attachment device for attaching a saddle to a seatpost, comprising: a base component to secure a swingarm assembly to a seatpost head and which defines a rotation perimeter centered about an axis providing a first or "primary" rotation adjustment, and an engagement device including a cavity configured with indexed slots to provide assistance in repositioning a saddle into a plurality of positions; a swingarm assembly configured to hold a saddle in place by its rails allowing fore and aft slidable adjustment and providing a second or "secondary" rotation adjustment about a central pivot axis allowing a method to reposition a saddle into a plurality of positions, comprising: a first and second swingarm member, each swingarm configured to slidably and pivotally engage with, and hold, a saddle rail in place, and a first and second outer clamp member, each clamp member configured to slidably and pivotally engage with, and hold, a saddle rail in place, complementing the swingarms; mounting hardware configured to securely attach the multi-position and orientation bicycle saddle attachment device to a seatpost assembly, together with a bicycle saddle, comprising: at least a first fastener bolt and at least a first nut.

Also, in one embodiment, there provides a lever assembly to selectively locate and relocate the swingarm assembly, comprising a lever to control movement of the swingarm assembly, a locking shaft configured to interface with a base component to provide a positive coupling, and a biasing member such as a torsion spring to provide resistance and assistance in locking and unlocking a lock shaft.

According to another aspect of the disclosure there is provided a second fastener bolt and a second nut.

According to a further aspect of the disclosure, there is provided a novel feature wherein the multi-position and orientation saddle attachment device described above may operate fully independent of a given seatpost's vertically oriented movement (ie. Raised or lowered vertically).

According to a further aspect of the disclosure, there is a provided a novel feature wherein the multi-position and orientation saddle attachment device described above may be configured to fit and retrofit a wide variety of seatposts both in existence and in development.

According to a further aspect of the disclosure, there is provided a novel feature wherein the multi-position and orientation saddle attachment device described above may be configured to fit and retrofit a wide variety of saddles both in existence and in development.

According to a further aspect of the disclosure, there is provided a novel feature wherein the multi-position and orientation saddle attachment device described above may include another embodiment of a base member having the facility to accept interchangeable index slots to allow customizable articulating angle range based on a user's preferences.

According to a further aspect of the disclosure, there is provided a novel feature wherein the multi-position and orientation saddle attachment device described above may include another embodiment of a base member with the facility to host a suspension-type assembly comprised of absorbent materials such as rubber, elastomer, or silicon to enable a substantial degree of roll, pitch, and yaw.

According to a further aspect of the disclosure, there is provided a novel feature wherein the multi-position and orientation saddle attachment device described above may include another embodiment of a base member with the facility to be operated by a handlebar mounted lever affixed to a cable, further affixed to the multi-position and orientation saddle attachment device.

According to a further aspect of the disclosure, there is provided a novel feature wherein the multi-position and orientation saddle attachment device described above may include another embodiment of a base member with the facility to be operated wirelessly by a handlebar mounted lever capable of sending wireless signals to affect movement, namely locking, and unlocking, of the multi-position and orientation saddle attachment device.

BRIEF DESCRIPTION OF THE DRAWINGS

FIG. 1 is a side view of a multi-position and orientation saddle attachment device according to an embodiment of the present invention, shown attaching a bicycle saddle to a seatpost assembly.

FIG. 1a is a side view perspective of an upper portion of a seatpost outlining hardware apertures.

FIG. 7a shows an exploded side view perspective of a swingarm and lever according to an embodiment of the disclosure.

FIG. 7b shows an exploded side view perspective of a swingarm and lever according to an embodiment of the disclosure.

FIG. 17b shows an underside view perspective of a lever component of 17a.

FIG. 19c shows a side view perspective of an isolated lever component of multi-position and orientation saddle attachment device embodiment of FIG. 19.

FIG. 19d shows side view perspectives of outer rail clamp components of multi-position and orientation saddle attachment device embodiment of FIG. 19.

FIG. 20 shows an application flow chart detailing one, among many, typical use case scenarios for a multi-position and orientation saddle attachment device according to an embodiment of the disclosure.

DETAILED DESCRIPTION OF THE DISCLOSURE

Figure 2:
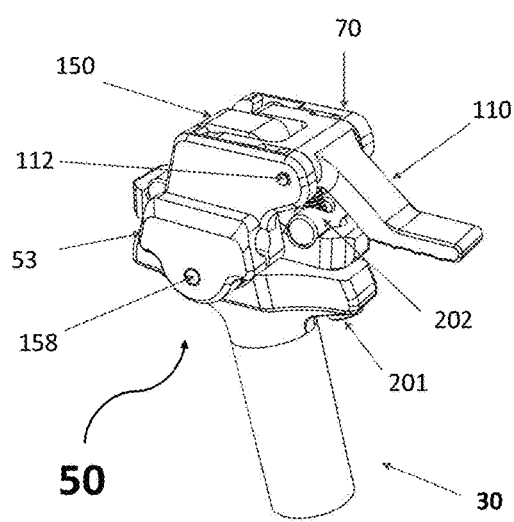
FIG. 2 is a front perspective view of an embodiment of a multi-position and orientation saddle attachment device of FIG. 1.

The inventor provides a novel multi-position and orientation saddle attachment device for attaching a bicycle saddle to a seatpost. The present disclosure is described in enabling detail in the following examples, which may represent more than one embodiment of the present disclosure. While various embodiments of the disclosure are described below, the invention disclosure is not limited to these embodiments, and variations of these embodiments may fall within the scope of the disclosure.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The terms "coupled", "coupling" or "connected" as used herein can have several different meanings depending on the context in which these terms are used. For example, the terms coupled, coupling, or connected may have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

The term "multi" or "multiple" or "plural" or "plurality" as used herein can be interpreted to mean more than one but is not meant to be limiting in nature.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New saddle attachment and positioning devices are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

According to embodiments of the disclosure, there is described a novel multi-position and orientation saddle attachment device for attaching, and adjusting the angle of, a saddle, attached to a bicycle seatpost. In one example of the disclosure, a multi-position and orientation saddle attachment device is secured to the top portion of a seatpost and is used to secure the bicycle saddle to the seatpost. In one broad aspect, the multi-position and orientation saddle attachment device may replace the standard rail clamping assemblies which are typically included with original equipment (OEM) seatposts and aftermarket seatposts. In some embodiments, the multi-position and orientation saddle attachment device includes rotatably movable swingarms which can be manually locked by a hand-actuated lever and slotted into fixed indexed positions without requiring the use of tools. For cyclists, the ability to adjust the bicycle saddle in a nose-down angle is beneficial for climbing. Conversely, the ability to lock the saddle in a nose-up position is beneficial for descending. Further, the ability to lock the saddle in a horizontally flat position is beneficial for traversing flat or undulating terrain. In some embodiments, the saddle attachment assembly may be attached to a bicycle seatpost by using one or more fastening bolts or by way of other appropriate fastening means.

Cycling, and particularly, mountain biking, requires dynamic movement as a cyclist navigates varying trail conditions. Because of this, bicycles feature a variety of adjustable components to meet the specific needs and desires of a rider based on their preferred style of riding. This writing, however, will focus on saddle positioning and orienting, or collectively the pose, including translation along a transverse plane, otherwise referred to more commonly in cycling terms as "fore" (ie. Forward) and "aft" (ie. Rearward) settings, or just simply "fore-aft," and rotational or angle or "tilt" settings, referring to the resting angle of a saddle and associated clamping assembly.

The disclosed novel multi-position and orientation saddle attachment device may be manufactured in a variety of materials including, but not limited to, various grades of aluminum, titanium, steel, carbon fiber, magnesium, or combinations of the above or other alloys.

Turning to FIG. 1, there is shown a bicycle seating apparatus 10 comprised of a bicycle saddle 20 attached to a seatpost assembly 30, fastened together by one example of a multi-position and orientation saddle attachment device 50. It may be noted that the bicycle saddle 20 and seatpost assembly 30, are accessories used in conjunction with the multi-position and orientation saddle attachment device 50 but are not part of its composition. It is also worth noting that the example of the seatpost assembly 30 as shown in FIG. 1 is representative of a conventional "two-bolt" style seatpost but is not meant to be limiting. As illustrated, a saddle 20 may comprise of two saddle rails 21 and 22. The multi-position and orientation saddle attachment device 50, is attached to the seatpost head 31 portion of the seatpost assembly 30 by fastening bolts, which, in one embodiment as illustrated, is applied to a two-bolt style seatpost assembly, includes a mounting bolt A 201, and a mounting bolt 204, each retained by a corresponding cylinder nut 202 (see cylinder nut 202 in FIG. 5) and cylinder nut 205 (see cylinder nut 205 in FIG. 5). It is important to note that some bicycle seatpost assemblies feature a single seat tube (not shown in this diagram), while "dropper seatposts," an example of which is depicted in FIG. 1, may comprise an upper tube 35 which slidably inserts into a lower tube 36. It is also important to note that the multi-position and orientation saddle attachment device 50, whether in its preferred or alternate embodiments discussed herein, is not limited to one type of seatpost design or assembly, and may be used interchangeably across a wide range of seatposts including single tube seatposts and dropper seatposts or substantially similar seatposts wherein a smaller diameter tube slidably inserts into a larger diameter tube, or electronically controlled wireless seatposts.

Figure 3:
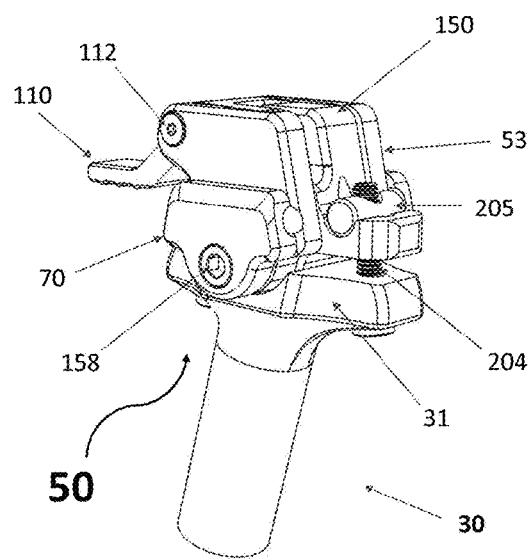
FIG. 3 is a rear perspective view of an embodiment of a multi-position and orientation saddle attachment device of FIG. 1

Referring to FIGS. 2 and 3, there is shown a top frontal and top rear view, respectively, of the bicycle multi-position and orientation saddle attachment device 50 of FIG. 1, shown attached to a seatpost assembly 30 but without showing a saddle or associated seat rails attached. The illustration shows a multi-position and orientation saddle attachment device 50 in a preferred embodiment comprised of several sub-assemblies. In the multi-position and orientation saddle attachment device 50 as shown, there are two swingarm assemblies including: swingarm assembly A 53, and swingarm assembly B 70, both of which have the purpose of (a) clamping a bicycle saddle's rails (see 21 and 22 of FIG. 1) to hold a saddle firmly in place, (b) facilitate slidable translation or 'fore and aft' saddle adjustment along a transverse (ie. Horizontal) plane, and (c) in one embodiment of the disclosure, assist in providing indexed "secondary" rotational adjustment by means of an engagement device. In the example shown, swingarm assemblies A 53 and B 70 are disposed on opposite sides of an indexed base member 150, fastened together by a clamp screw 158, or other appropriate means for suitably fastening swingarm assemblies A 53 and B 70, which may come in a variety of drive types such as a hex (as shown in the diagram FIGS. 2 and 3), flathead, or Philips type screw. Referring to the multi-position and orientation saddle attachment device 50 as shown, there is an actuating mechanism that consists of a hand-actuated lever assembly 110 rotatable about a pivot axis that is used to unlock and lock the swingarm assemblies 53 and 70 into fixed indexed positions; an in-depth explanation of the lever follows in FIGS. 17*a* and 17*b*. The lever assembly 110 is held in place by a pivot shoulder bolt 112. As shown in the diagrams, mounting bolts A 201 and mounting bolt B 204, are configured to engage with mounting nuts 202 and 205 respectively, and when tightened with enough force, effectively attaches the multi-position and orientation saddle attachment device 50 to the seatpost head 31 of the seatpost assembly 30.

Figure 4:
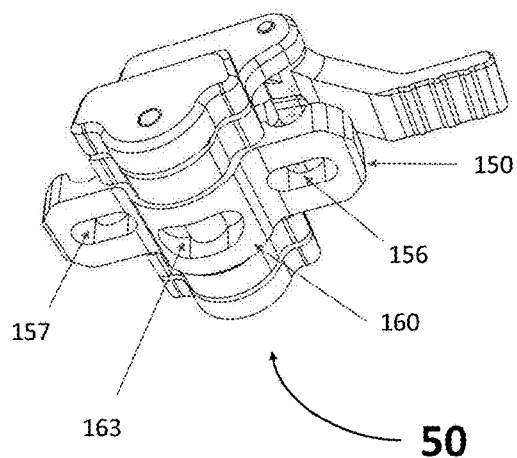
FIG. 4 is a bottom perspective view of an embodiment of a multi-position and orientation saddle attachment device of FIG. 1.

FIG. 4 shows a bottom perspective view of a version of a multi-position and orientation saddle attachment device 50. As shown in an embodiment of base member 150, there features three apertures including: (a) fastener hole A 156 and (b) fastener hole B 157, both of which are designed to accept and interface with fastening hardware; and (c) identified as access hole 163 to allow access to air valves or other accessories. Located on the lower-most region of the base member 150 as illustrated, is a convex arc-shaped protrusion identified as base bearing surface 160 configured to interface with a variety of seatposts that feature complementary opposing arc-shaped cradles and generally defines a rotation perimeter centered about an axis providing a first or "primary" rotation adjustment. In the example shown, base bearing surface 160, interfaces with a complementary arc-shaped bearing surface of a seatpost head cradle support 32, seen in FIG. 5.

Figure 5:
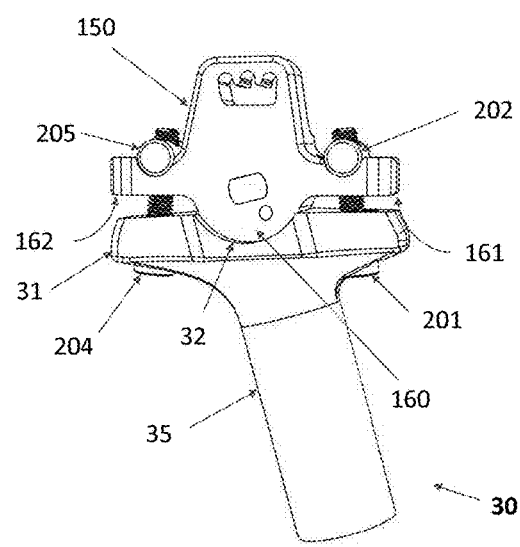
FIG. 5 is a side view perspective of an isolated base portion of a multi-position and orientation saddle attachment device attached to a seatpost, according to an embodiment of the disclosure.

Continuing with FIG. 5, the illustration shows a base member 150, in isolation without the counterpart swingarm assemblies referenced in FIGS. 1, 2 and 3; displayed as such to show an unencumbered view of one method of connecting the multi-position and orientation saddle attachment device 50 to a similarly configured seatpost assembly 30. It is worth noting that, in an embodiment of the disclosure, the base member 150 dictates the "primary" rotational setting of the entire multi-position and orientation saddle attachment device 50. In the example, the lower-most region of the base member 150 features an arc-shaped bearing surface 160 configured to engage with a seatpost head cradle support 32. The complementary arc-shape of the two opposing bearing surfaces enable free infinite rotation about an axis which, in the example shown, is limited when making contact with the furthest extents of the base member 150: identified as extent A 161 and extent B 162. In one embodiment, a base member 150 may feature a central, or generally centrally-located, arc-shaped lower portion, such as seen in this example. In another embodiment of a base member, the lower portion may also be arc-shaped but offset, located with a bias towards one end of a seatpost head, or offset to the other end of said seatpost head on a horizontal plane. It is worth noting that the radius of the arc-shaped lower portion of the base member 150 may be manufactured in a plurality of radii. For example, one embodiment of a base member 150 may feature a lower-portion with a bearing surface featuring a 14 mm radius as may be shown in bearing surface 160 of base member 150. In other embodiments, the bearing surface may feature a radius of 12 mm or 13 mm or 15 mm etc.; note that these examples illustrate variety and do not suggest that a single base member may feature several arc-shape bearing surfaces. Further, the radius of complementary seatpost cradle supports, such as the cradle support 32 seen in FIG. 5, may also come in a variety of complementary radii, and not limited to one set standard.

Bicycle seatposts come in a variety of seatpost head configurations, commonly referred to in a multitude of ways including for example, "saddle rail clamps", "saddle clamps", "seat clamp", or "seat attaching clamp," and a host of others not mentioned but not intended to be excluded. These generic terms and the like may at times be used to refer to devices that fall within the general field of the invention but are not meant to be confused with the novel multi-position and orientation saddle attachment device 50 as shown in FIG. 1, and for which this writing is intended. When such generic terms are used, it is for the purposes of describing conventional and/or existing saddle clamping assemblies.

Among the most common types of saddle clamps found in use today are single bolt clamp assemblies, two-bolt saddle clamp assemblies, and beam-type saddle clamp assemblies. The multi-position and orientation saddle attachment device 50 referred to herewith and as seen in FIG. 1, will, in a preferred embodiment, be described to correspond with a two-bolt clamp style seatpost—a style of clamp assembly that may be configured to correspond with single-tube seatposts, telescopic dropper seatposts, suspension seatposts, electronically operated seatposts, or other varieties of seatposts.

Turning once again to FIG. 1, the embodiment of multi-position and orientation saddle attachment device 50 features two distinct methods to adjust rotational angles: a first method and one that can be considered a "primary" rotational setting—which is a basic and common feature found across most conventional saddle clamps—and a second method or "secondary" rotational adjustment, which is a prominent and novel feature of the multi-position and orientation saddle attachment device 50 described in this writing. For clarity, an example of a standard two-bolt seatpost is depicted in FIG. 1, referring to the seatpost assembly 30 as shown. A conventional two-bolt style seatpost as depicted in FIG. 1 and shown in isolation in FIG. 1a, can be characterized by a cradle support 32, and two axial apertures: shown as fastener hole A 33, and fastener hole B 34, and located at opposite ends of a seatpost head 31, designed to receive insertable mounting bolts: bolt A 201 and bolt B 204, which, when fastened to corresponding nuts (seen more clearly in FIG. 5): nut A 202, and nut B 205, securely attaches a compatible saddle clamp assembly by the saddle's rails: rail 21 and 22, nested between them as depicted in FIG. 1. Similar to standard two-bolt style seatposts featuring conventional saddle clamp assemblies, the multi-position and orientation saddle attachment device 50 provides rotational adjustment, hereto referred as "primary" rotation, by initiating a cycle of tightening and loosening mounting bolts, examples of which are depicted by bolts 201 and 204 in FIG. 1, until a desired "primary" rotational adjustment is found. Typically, tightening (ie. turning the bolt in a clockwise rotation) a front mounting bolt, as depicted by bolt 201, in conjunction with loosening the rear mounting bolt 204, may cause the position of the multi-position and orientation saddle attachment device 50 and saddle (if so attached) to angle nose-downwards, for example, minus 5 degrees, as it rotates about a pivot axis dictated by the concave and curved bearing surface of a seatpost cradle support 32 (see FIGS. 1 and 5). The method described will result in a resting position whereby the anterior portion of the saddle, hereto referred to as the nose 25, is substantially tilted downwards while the posterior end of the saddle, referred to as the seat 26, will point substantially upwards. Conversely, tightening a rear mounting bolt, as depicted by bolt 204, in conjunction with loosening bolt 201, will produce the opposite effect whereby the saddle nose 25 will substantially tilt upwards, for example, positive 5 degrees, while the posterior seat 26 will substantially tilt downwards. To recapitulate, the above-described method captures a significant portion of the steps required to adjust the "primary" rotational settings of a typical saddle clamp assembly, and the multi-position and orientation saddle attachment device 50 as illustrated in FIG. 1.

A novel aspect of the preferred embodiment of the multi-position and orientation saddle attachment device 50 referenced in FIG. 1, is the introduction of a "secondary" rotational or tilt adjustment setting. Above and beyond fore-aft saddle adjustability found commonly across conventional saddle clamp assemblies, and above and beyond the "primary" and "infinite" rotational adjustability also commonly found across conventional saddle clamp assemblies, the novel multi-position and orientation saddle attachment device 50 features a saddle repositioning mechanism 52 (see FIGS. 6 and 7 for a partial reference), comprised of a first swingarm assembly A 53, and a second swingarm assembly 70, and a lever assembly 110 that, together, enable a "secondary" and "indexed" saddle rotation adjustment, in addition to allowing translation settings along a horizontal plane, otherwise referred to as 'fore and aft' settings, details of which will follow below.

General Assembly

Figure 6:
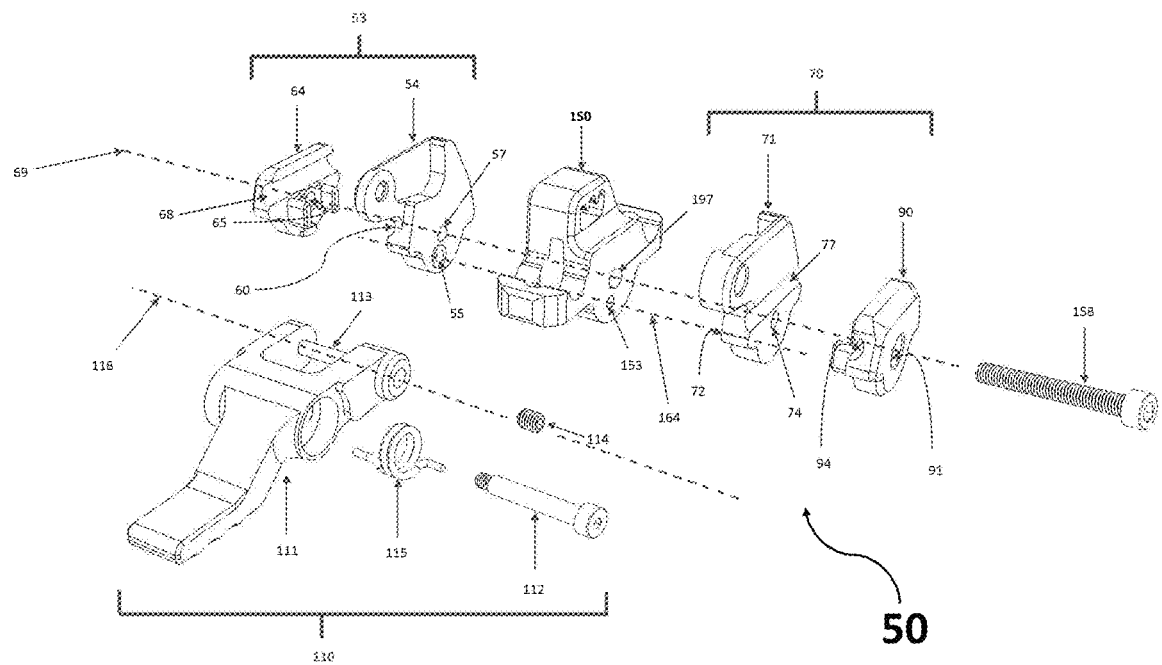
FIG. 6 shows a frontal exploded view of a multi-position and orientation saddle attachment device according to an embodiment of the disclosure.

Turning to FIG. 6, there is shown an exploded view of an embodiment of multi-position and orientation saddle attachment device 50, comprised of a saddle repositioning mechanism 52, comprising a first swingarm assembly A 53 and a second swingarm assembly B 70, situated at opposite sides of a base member 150, and a lever assembly 110 which together are responsible for the novel "secondary" rotational adjustment. As shown in swingarm assembly A 53, featured there is a vertically oriented swingarm A 54, and a corresponding vertically oriented outer clamp A 64. Disposed on the opposite side of the base member 150, and parallel to swingarm assembly A 53, is swingarm B 70, similarly comprised of a vertically oriented swingarm B 71, and a corresponding vertically oriented outer clamp B 90. Swingarm assembly A 53, swingarm assembly B 70, and base member 150, as shown, are fixedly held together by a clamp screw 158. Clamp screw 158 functions as the fastener responsible for connecting various individual parts of the assemblies together, running through adjoining horizontal apertures aligned along clamp axis 69. One method in which the clamp screw 158 initiates connection is depicted in the diagram going from right to left, first by insertion through clamp B counterbore 91 of clamp B 90, followed by insertion through clamp screw hole B 74 of swingarm B 71, then through swingarm hole 197 located within base member 150, continuing through clamp screw hole 57 of swingarm A 54, culminating by insertion through complementary threads found inside clamp A hole 65 of clamp A 64. Tightening clamp screw 158 inserted through the previously noted components and threadedly nested within the clamp A hole 65 of clamp A 64 will successfully connect the sub-assemblies together (an explanation of the lever assembly 110 as it relates to the overall assembly will follow in FIG. 7 below). Secure tightening is accomplished when the rotatability of the main pivot clamp screw 158 is interfered with and when contact is made with the threads located within clamp A hole 65. It may be worth noting that the above noted order of connection is reversible if a user so chooses by switching the sides in which clamp B 90 and clamp A 64, are installed. For example, as shown in FIG. 6, clamp B 90 is installed on the right-hand side and clamp A 64 is installed on the left but it is possible to reverse this by installing clamp A 64 on the right and clamp B 90 on the left allowing users to choose the orientation most suitable for their needs (ie. left-handed user vs. right-handed user). If this alternative orientation is desired, it would then follow that the main pivot clamp screw 158 would enter from the opposite or left side as shown in the diagram, continuing through each component in reverse order versus previously described, and similarly culminating in the threads located inside clamp A 64 disposed at the opposite end of the assembly. Any other suitable fastening means that fastens swingarm assembly A 53 and swingarm assembly B 70 can be used.

Figure 7:
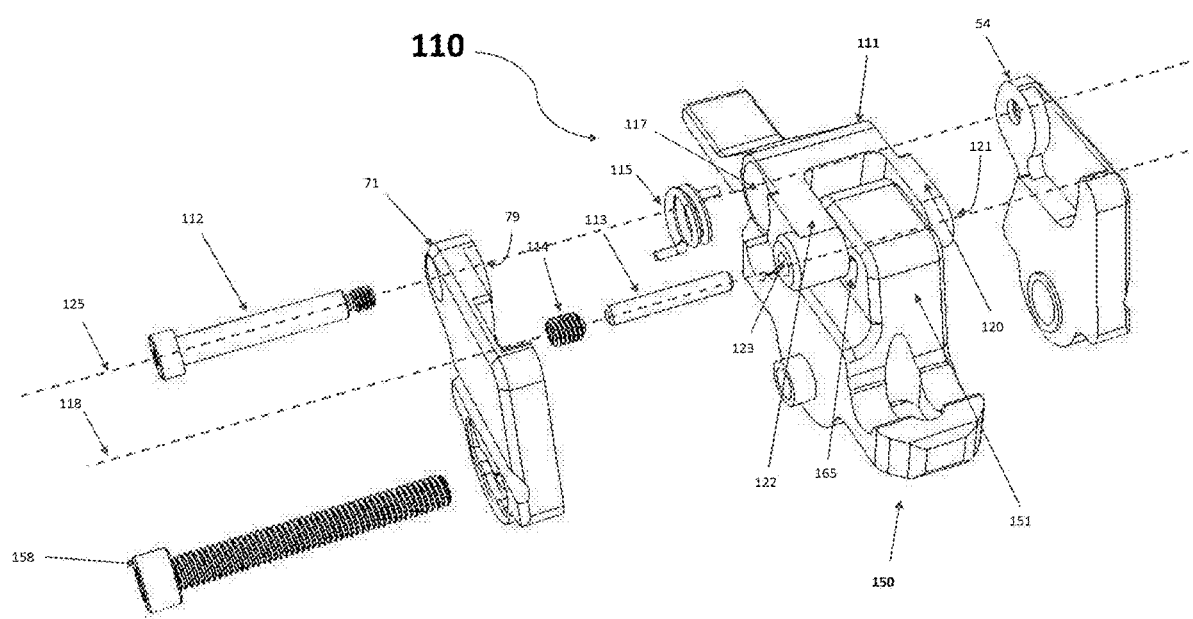
FIG. 7 shows an exploded top view of a portion of a saddle repositioning mechanism according to an embodiment of the disclosure.

Referring to FIG. 7 there is shown an embodiment of lever assembly 110, represented in FIGS. 2 and 6, showcasing one embodiment of a lever 111 which engages with the base member 150. General attachment to the base member 150 is achieved when posterior members of the lever 111, including arm A 120 and arm B 122, together forming a "U" shaped receiver, straddle the asymmetrical bridge 151 portion of the base member 150. Movement of lever 111 is restricted when the index lock shaft 113 follows horizontal axis 118 and is inserted through the arm B hole 123 continuing through the index cavity 165 (see also FIG. 6 for a clearer view) of the base member 150, culminating through the arm A hole 121. A retaining screw 114 threadedly inserts into arm B hole 123 to securely fix the index lock shaft 113 in place. A biasing member such as torsion spring 115 nests within the cylindrically shaped corresponding lever spring barrel 117 of lever 111, fixed in place when engaged with, and nested within, a corresponding cylindrically shaped spring barrel 79 (see also FIG. 7b) of swingarm B 71. A pivot shoulder bolt 112 follows horizontal axis 125 and inserts through swingarm B 71, torsion spring 115, lever 111, and swingarm A 54, securing them all together. Referring to FIG. 7a, the torsion spring 115, when horizontally aligned along left-right running shoulder bolt axis 125, and nested within the lever spring barrel 117, is sandwiched firmly in place when a torsion spring finger A 115a is inserted into spring preload hole C 116a. Continuing on to FIG. 7b is a mirror image of FIG. 7a (ie. same components however in reverse view), where there is shown the torsion spring 115 sandwiched and held firmly in place when torsion spring finger B 115b is inserted into spring preload hole A 80a. Alternatively, torsion spring 115 may be held in a slightly offset position when torsion spring finger A 115a is instead inserted into spring preload hole D 116b (see FIG. 7a), and torsion spring finger B 115b is inserted into spring preload hole B 80b (see FIG. 7b).

Figure 8:
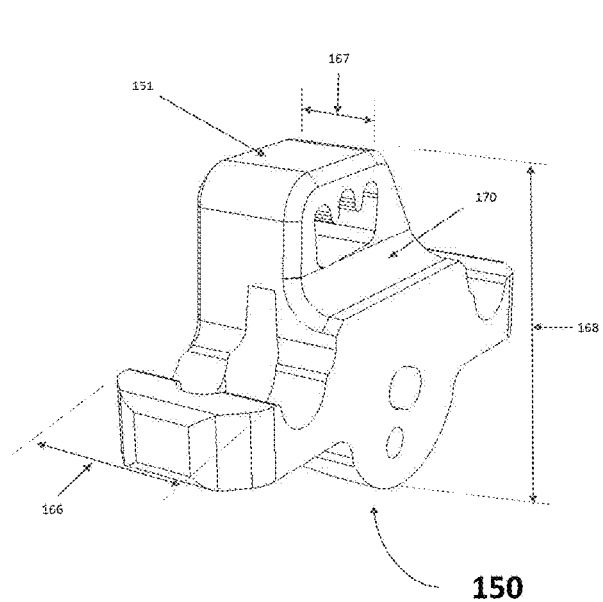
FIG. 8 shows a perspective view of a base member component featuring dimensions according to an embodiment of the disclosure.

Turning to FIG. 8 there is shown a left-side perspective view of a base member 150 in a preferred embodiment. The base member 150 in one embodiment, shows a distance 166 of approximately 10 mm to 30 mm in length, preferably between 15 mm to 25 mm, and more preferably between 18 mm and 22 mm in length. The top asymmetrical bridge 151, spans an end-to-end distance 167 of between approximately 8 mm to 25 mm in length, preferably between 12 mm and 20 mm, and more preferably between 10 mm and 15 mm in length. In some embodiments, the asymmetrical bridge 151 of the base member 150 may be oriented on the left side as shown in the diagram, while in other embodiments it may be on the other side or, in other embodiments, the bridge may be symmetrical. The asymmetrical bridge 151 features a curved cutaway 170 allowing an engagement path to interface with arm B 122 of lever 111 (see FIG. 7). The base member 150, in one embodiment, shows a distance 168 of approximately 30 mm to 50 mm in length, preferably between 35 mm and 45 mm, and more preferably between 30 mm and 45 mm in length.

Figure 9:
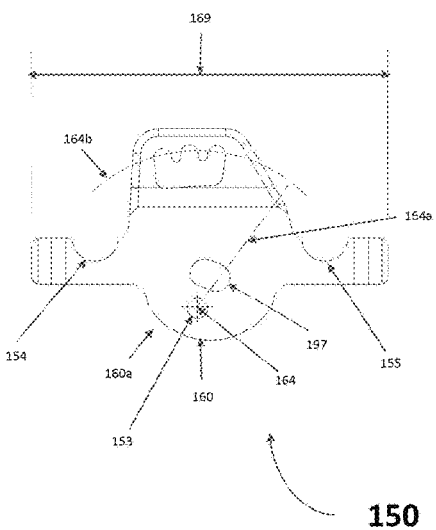
FIG. 9 shows a left-side view of a base member component showcasing dimensions and geometries according to an embodiment of the disclosure.

Shown in FIG. 9 is an elevated left-side profile view of base member 150 where in the illustrated embodiment, features an end-to-end distance 169 of approximately 50 mm to 100 mm in length, preferably between 45 mm and 90 mm in length, and more preferably having a length between 60 mm to 75 mm. At opposing ends are two curved cradles designed to hold fastening nuts in place. At one end is nut cradle A 154 and on the other end is nut cradle B 155, designed to hold cylinder nuts A 202 and 205 in place, fastened together by bolt A 201 and 204 respectively (as seen in FIG. 5). Axis 164 dictates a radius 164a of approximately 30 mm producing an arc 164b. Swingarm assemblies 53 and 70, pivot about axis 164 located within base pivot hole 153, allowing rotation and thus the ability to reposition an attached bicycle saddle. The base member 150 features a base bearing surface 160 having, in one embodiment, an approximate radius 160a of 14 mm, designed to nestle within a complementary cradle found on most two-bolt style seatposts. In other embodiments of a base member 150, the associated base bearing surface 160 may feature different radius, for example, 10 mm radius or 11 mm radius or 12 mm radius or 13 mm radius or 15 mm radius and so on, to correspond with a variety of different seatpost dimensions and geometries. In an embodiment of base member 150, there features an odd-shaped swingarm hole 197 to allow clamp screw 158 (see FIG. 6) entry and pass through as it fixes swingarm assemblies 53 and 70 (see FIGS. 6 and 18a) together with base member 150.

Figure 10:
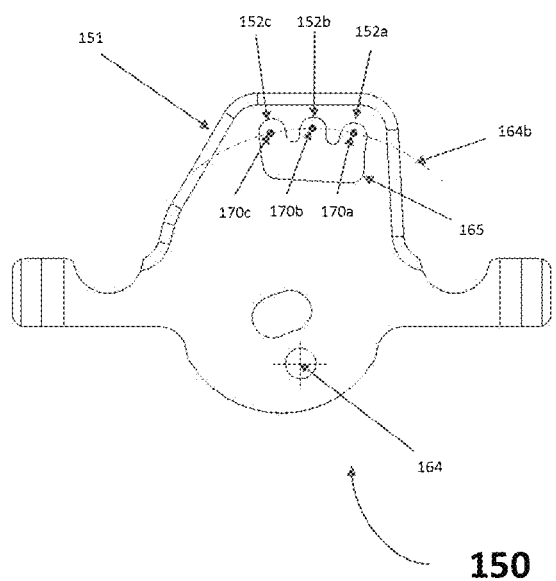
FIG. 10 shows a right-side view of a base member component showcasing index positions according to an embodiment of the disclosure.

Shown in FIG. 10. is an elevated right-side profile view of base member 150 where, in one embodiment, it features a flat-shaped face, unlike the asymmetrical shape of the opposing left side seen in FIG. 9. In a preferred embodiment of bridge 151 there is an index cavity 165 featuring three (3) index slots: 152a, 152b, and 152c. Index slots 152 a, b, c, are designed to interface with the index lock shaft 113 (see FIG. 7 and FIG. 13) effectively locking swingarm assemblies 53 and 70, and lever assembly 110 (see FIG. 6) in any one of three fixed positions as shown in the preferred and illustrated embodiment of FIG. 10. Bridge 151 may include a plurality of index slots. In other embodiments of bridge 151, there may be as few as two (2) similarly circular-shaped index slots located within an index cavity 165 or as many as 3, 4 or 5 or 6 or more, dependent on the design of the index cavity 165 when coupled with a complementary-designed index lock shaft 113. In other embodiments, index cavity 165 or a component feature of similar function may, instead of circular-shaped slots, feature friction locking jagged-shaped indexes, splined indexes, square shaped indexes, interlocking teeth shapes, detents, slots, grooves, engagement teeth, ratchet and pawl mechanisms, or friction engagement devices in general etc., generally configured for the purpose of temporarily fixing two or more parts together to prevent involuntary displacement and generally configured to correspond with the shape of a locking mechanism, for example, a lock shaft 113 as seen in FIGS. 6 and 7. In a preferred embodiment of base member 150, the axes 170 a, b, and c, matched to index slots 152 a, b, and c respectively, are equidistantly spaced from each other, configured and aligned to receive index lock shaft 113 of lever assembly 110, and, together part of swingarm assemblies 53 and 70, rotate about axis 164 and defining arc 164b as illustrated in FIG. 10 and further illustrated in the application diagram of FIG. 13 (described in detail further on). As illustrated in FIG. 10 and referred to in FIG. 13, the embodiment of index cavity 165 with equidistantly placed index slots 152a, b, and c, may also, in other embodiments, produce a full articulating angle range of anywhere between 15 degrees from anterior to posterior index slot, or 20 degrees difference or 30 degrees or more, with locked increments of around 10 degrees apart relative to each other when an index lock shaft 113 is coupled and received into any one index slot. When coupled together, the described mechanism effectively and securely locks the swingarm assemblies 53 and 70 in fixed positions optimized for uphill climbing, flatter trails, or descending; refer to FIG. 13 for a graphic depiction which shows cross-section views of multi-position and orientation saddle attachment device 50 locked in three possible positions when index lock shaft 113 is coupled into any one of index slots 152a, b, or c. In another embodiment of a base member 150, an index cavity 165 may feature a plurality of index slots that are not equidistantly spaced apart. For example, they may be spaced apart to produce locking increments not equaling 10 degrees relative to one another. For example, the distance between the axis 170a of index slot 152a and the axis 170b of index slot 152b, and in relation to pivot index 164 may, in other embodiments, vary, to produce locking increments within a range from as little as 2 degrees difference relative to one another, to as much as 20 degrees or more. And similarly, for example, the difference between the axis 170b of index slots 152b and axis 170c of index slot 152c, and in relation to pivot index 164 may, in other embodiments, vary, to produce locking increments within a range from as little as 2 degrees to as much as 20 degrees of more. In another embodiment of base member 150, an index cavity 165 may feature a plurality of index slots beyond the preferred three as illustrated in FIG. 10, for example, having as few as 2, to as many as 10, 15, 20 or more.

Figure 11:
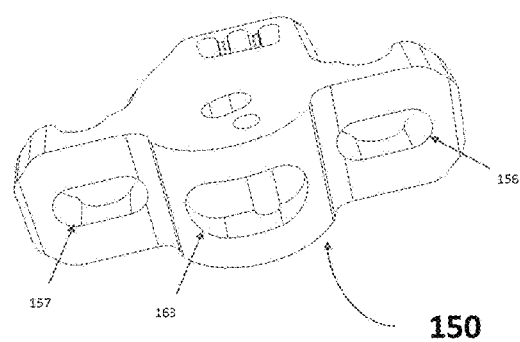
FIG. 11 shows a bottom perspective view of a base member component showing apertures according to an embodiment of the disclosure.

Shown in FIG. 11 is a bottom perspective view of base member 150, where in one preferred embodiment there may be seen two pill-shaped apertures identified as fastener hole A 156, and fastener hole B 157, on opposing sides of bridge 151, and are designed to receive axial mounting bolts 204 and 201, and, when coupled with cylinder nuts 205 and 202 respectively, effectively secure base member 150 to a seatpost head 31 as seen in FIG. 5. In a preferred embodiment of base member 150 there may be a centrally located aperture at the lower region identified as access hole 163 configured to allow access for hardware, air valves, or other assemblies required to maintain or service a seatpost.

Figure 12:
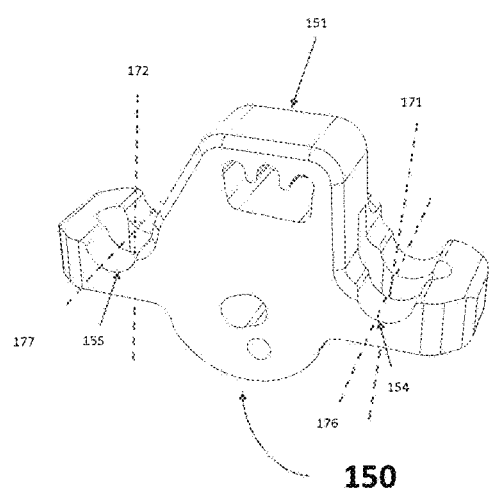
FIG. 12 shows a side view perspective of a base member component showing vertical and horizontal axes according to an embodiment of the disclosure.

FIG. 12 shows a side perspective view of base member 150, featuring axis 171 running vertically where mounting bolt A 201 axially inserts, and axis 172 where mounting bolt B 204 axially inserts (see also FIG. 5). Running laterally there is nut axis 176 defined by the curvature of nut cradle A 154 designed to interface with cylinder nut A 202. On the opposite side of bridge 151 is nut axis 177 defined by the curvature of nut cradle B 155 designed to interface with cylinder nut B 205. It is worth noting that nut cradle 154 has a semi-circular perimeter circumference that corresponds with the circular shape of cylinder nuts 202 (see FIG. 5) allowing free and unlimited rotation about axis 176. Similarly, nut cradle 155 has a semi-circular perimeter circumference that corresponds with the circular shape of cylinder nuts 205 (see FIG. 5) allowing free and unlimited rotation about axis 177. The circular configurations of nut cradle 154 and 155 provide a limited range of movement when corresponding bolts 201 and 204 are inserted into nuts 202 and 205 respectively. Referring to FIG. 11 and FIG. 5, the pill-shaped curved apertures 156 and 157 located at the bottom of base member 150 span wide enough apart to allow a substantial range of pivotal movement for bolts of various diameters that are axially inserted and configured together with a corresponding nut. This design feature allows the base member 150, and hence the entire multi-position and orientation saddle attachment device 50, to be fitted across a wide range of bicycles seatposts configured to receive two bolts and nuts, having a seatpost head configuration similar to seatpost head 31 seen in FIG. 5 with two horizontal axial apertures that are spaced apart differently from the one used in the figures seen above. For additional clarity, this is to say that no two seatposts are exactly alike, and that a substantial number of seatposts have axial apertures spaced differently ie. with different length spacing measured from the central axis of, for example, an anterior located axial aperture and posterior located axial aperture. Despite the variety of seatpost head designs whether in existence or development, the inventive disclosure is designed to work with a substantial number, and wide array, of seatposts and not necessarily confined to any one.

Figure 14:
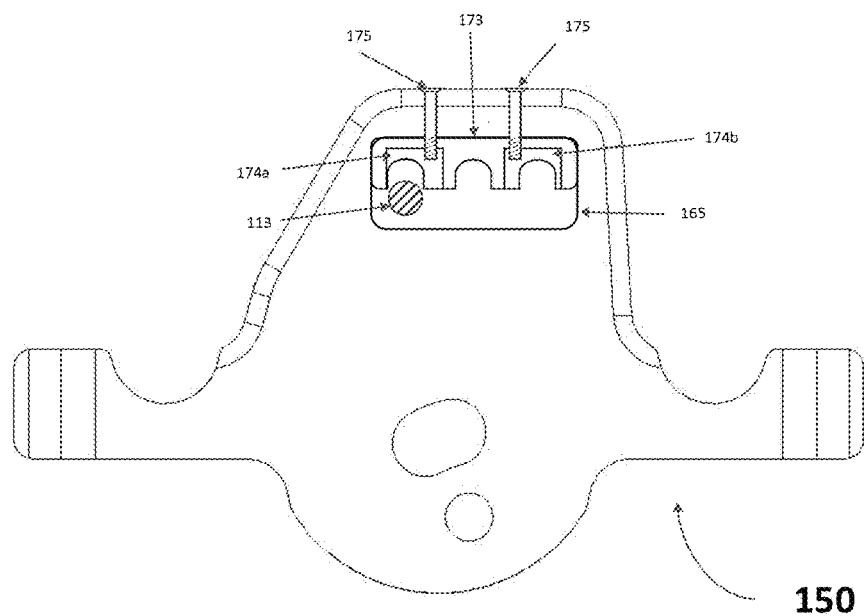
FIG. 14 shows another embodiment of a base member component with replaceable flip chips.

FIG. 14 shows a side view profile of another embodiment of base member 150, featuring another embodiment of an index cavity 165 with the ability to receive a cavity interface 173 designed to host index slots such as 152a, b, and c as seen in FIG. 10. In one embodiment as illustrated, a cavity interface 173 is configured to accept removable and replaceable index slots 174a and 174b which, according to some embodiments, may feature cylindrical interfaces as illustrated, or square-edged interfaces, or splined interfaces etc., generally configured for the express purpose of temporarily fixing two or more parts together to prevent involuntary displacement, and generally configured to correspond with the shape of a locking mechanism, for example, a lock shaft 113 as seen in FIGS. 6 and 7. As illustrated, the removable index slots 174 a and b (also known as "flip chips") enable a user to further customize saddle angle adjustments simply by choosing how to orient the chips relative to anterior and posterior slot positioning. In the example shown in FIG. 14, index slot 174a is shown to be locked in the 'posterior position', held fixedly in place by index bolt 175. In this setup, index lock shaft 113 (also see FIG. 7 for clarity), when interfaced with index slot 174a will produce one such desired fixed angle. If desired, a user may elect to reorientate index slot 174a so that the index slot interface is in the 'anterior position' which may produce a change in fixed angle position of anywhere between 1 degree to 5 degree range when coupled with index lock shaft 113. Similarly, index slot 174b when configured and re-configured in either anterior or posterior positions, will produce similar effects in terms of customized angle changes when coupled to index lock shaft 113. This capability depicted in FIG. 14 allows a user to selectively refine the ending locked position of the multi-position and orientation saddle attachment device 50 and thereby customize the articulating angle range to suit preferences. Additionally, repositioning the index slots 174a, 174b, or both will effectively alter the 10 degree increments first referenced in FIG. 10 by about plus or minus 1 degree to 5 degrees. For example, if a rider prefers more of a cross-country setup with a bias for climbing, he may choose to position the removable index slot 174*b* so the curved interface is forward, locked in the anterior position which would allow approximately 1 degree to 2 degrees more steepness to the saddle when engaged with the index slot 113. In another embodiment of an index cavity 165, there features the capability to host a cavity interface 173 comprising soft material such as, for example, rubber, elastomer, silicon, or other malleable material to allow a substantial degree of roll, pitch, and yaw enabling the sensation of suspension and absorption qualities, often desired by cyclists. A suspension-like feel may be accomplished, in one aspect, by another embodiment of index slots 174*a* and 174*b*, whereby the are composed of said malleable materials such as rubber, elastomer, silicon, or other malleable material generally configured for the express purpose of temporarily fixing two or more parts together to prevent involuntary displacement, and generally configured to correspond with the shape of a locking mechanism, for example, a lock shaft 113 as seen in FIGS. 6 and 7. In another aspect, an index cavity 165 may be designed to directly host another embodiment of a cavity interface 173 composed of malleable materials such as rubber, elastomer, silicon, or other malleable material, generally configured for the express purpose of temporarily fixing two or more parts together to prevent involuntary displacement, and generally configured to correspond with the shape of a locking mechanism, for example, a lock shaft 113 as seen in FIGS. 6 and 7.

Figure 15B:
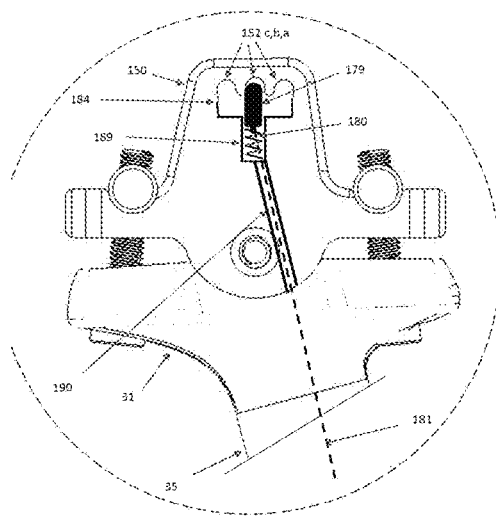
FIG. 15 shows another embodiment of a base member component featuring a cable-actuated mechanism to lock and unlock a saddle repositioning mechanism according to an embodiment of the disclosure.
Figure 15A:
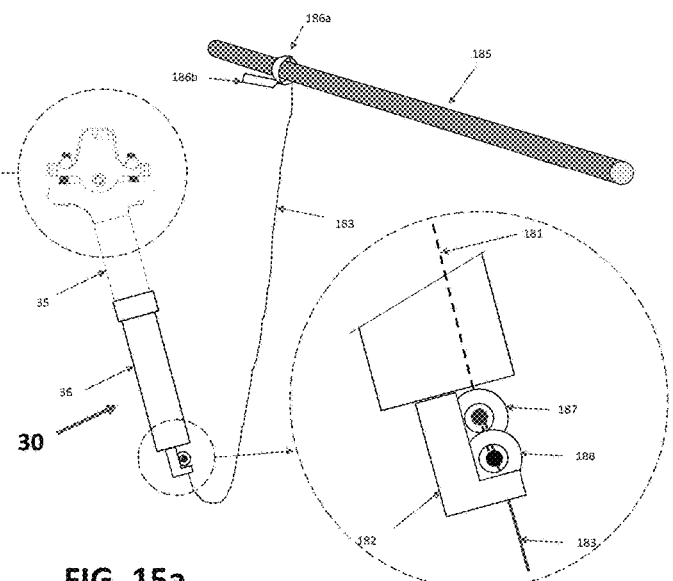
Figure 15C:
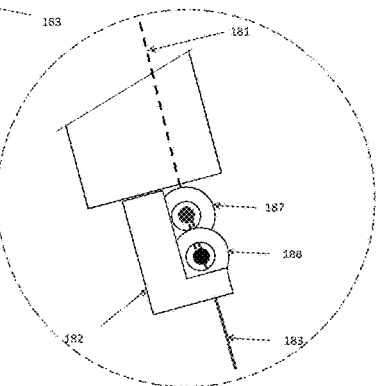

FIGS. 15*a*, 15*b*, and 15*c* show another embodiment of base member 150, and associated components, designed to work with a cable-actuated mechanism to lock and unlock the swingarm assemblies 53 and 70 first seen in FIG. 2. It is worth noting that a cable-actuated mechanism may be internal, as seen in this following described embodiment, or external (not shown). FIG. 15*a* shows a side view of a seatpost assembly 30 comprised of an upper tube 35 and lower tube 36. FIG. 15*b* shows a zoomed-in cross-section diagram of an embodiment of base member 150 with an irregular shaped index cavity 184 featuring a spring cavity 189 capable of housing a biasing member or spring 180. As illustrated, lock shaft 179 may be retracted by cable 181 and extended by the force of spring 180. Cable 181 is attached to the bottom of index lock shaft 179 and runs down through a spring cavity 189 and through a hollow cable channel 190 continuing through the seatpost assembly 30 including through seatpost head 31, upper tube 35, lower tube 36, and contained within cable host 188 connected to a novel double-barreled actuator 182 which also houses cable host 187. Unlocking index lock shaft 179 begins at handlebar 185 by pressing lever 186*b* on lever assembly 186*a*. This action initiates the pulling-through of cable 183 which is contained within cable host 187. When cable host 187—situated above cable host 188—is pulled with substantial force, it engages and integrates with intercepting cable host 188 and, when coupled together, may then continue to be pulled in unison causing cable 181 to also be pulled. This action then pulls the index lock shaft 179 vertically downward thus unlocking the embodiment of base member 150 to move freely about a pivot.

Figure 16:
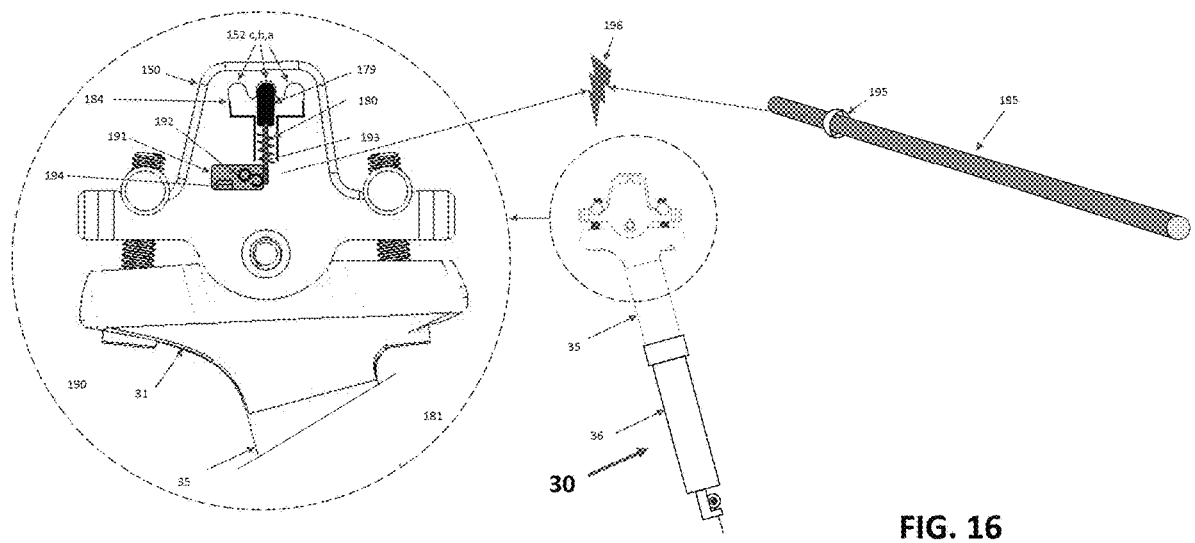
FIG. 16 shows another embodiment of a base member component depicting a wireless method to lock and unlock the saddle repositioning mechanism according to an embodiment of the disclosure.

FIG. 16. Shows another embodiment of base member 150, and associated components, designed to be wireless and work with a motorized and electronically controlled servo mechanism or mechatronic actuation assembly or gear box 191—to lock and unlock the swingarm assemblies 53 and 70 first seen in FIG. 2. This electronic wireless embodiment of base member 150 borrows components first seen in FIGS. 15*a*, *b*, and *c*, and introduces a plurality of gears 192 to drive a piston or pistons 193, to drive lock shaft 179 into one, among a selection of, available index slots 152 *a-c*. Gear box 191 may be powered by a battery or batteries 194, or other electronic method, and is activated wirelessly by, for example, a handlebar 185 mounted transmitter 195 or similar transmitter mounted elsewhere on a bicycle or a person (ie. Wearable technology). When transmitter 195 is pressed, a wireless signal is sent to gear box 191 which, through sequential connections, ultimately pulls lock shaft 179 downwards to unlock. When transmitter 195 is depressed, the reverse is true and lock shaft 179 becomes locked into one of the index slots 152 *a*, *b*, or *c*.

Figure 17A:
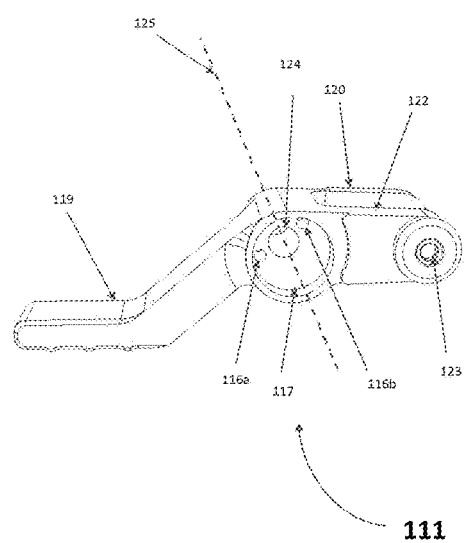
FIG. 17a shows a side view perspective of a lever component according to an embodiment of the disclosure.

FIG. 17*a* shows a side view perspective of a preferred embodiment of lever 111, versions of which are seen in FIGS. 6, 7, 7*a*, and 7*b*. As illustrated, lever 111 features spring preload holes 116*a* and 116*b* which interface with a torsion spring 115 (see FIGS. 7, 7*a*, and 7*b*). The preload holes 116*a* and *b*, are situated within a spring barrel 117 which holds a torsion spring 115 in place. A non-concentric hole 124 allows a shoulder bolt 112 (see FIG. 7) to pass through allowing lever 111 to move about pivot axis 125 which aids in locking and unlocking swingarm assemblies 53 and 70 (see FIG. 6). Lever 111 is operated by hand when handle 119 is pulled upward, pivoting about axis 125 (see FIG. 7*a*) and working against the forces of a torsion spring 115 (see FIG. 6) which releases a lock shaft 113 (see FIG. 6) which is inserted into the arm hole 123, through arm B 122 and arm A 120, and held in place by a retaining screw 114 (see FIG. 7).

Figure 17B:
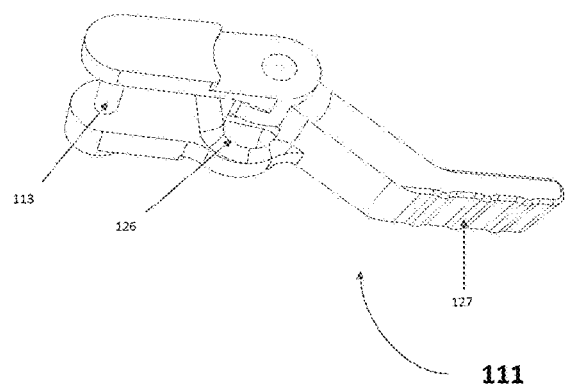

Turning to FIG. 17*b*, there is shown an underside perspective view of lever 111, highlighting a bolt cavity 126 which allows clearance for a variety of mounting hardware such as bolt 201 seen in FIG. 2. In one embodiment of lever 111, there may be grip-like extrusions or finger holds 127, cut into the foremost part of the lever as seen in the illustration.

Figure 18A:
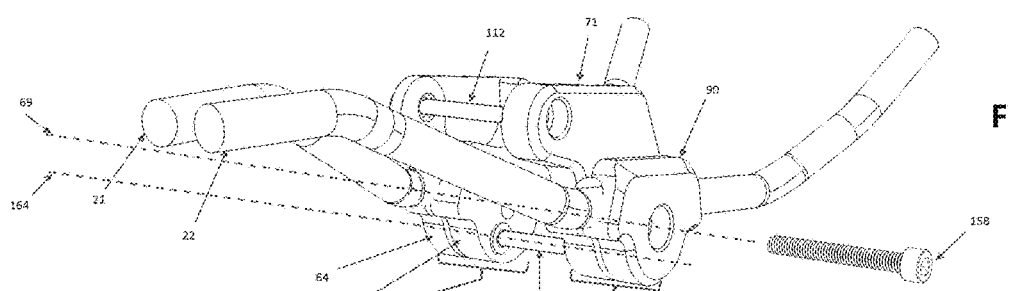
FIG. 18a shows a frontal perspective view of a multi-position and orientation saddle attachment device retaining a set of saddle rails according to an embodiment of the disclosure.

FIG. 18*a* shows a frontal perspective of an embodiment of swingarm assemblies 53 and 70 shown retaining a pair of saddle rails 21 and 22. As shown, a saddle rail such as rail 22, is held in place between swingarm 71 and outer clamp 90, and a second saddle rail shown here as rail 21, is held in place between swingarm 54 and outer clamp 64. Swingarm assemblies 53 and 70, inclusive of sub-components, are in turn fixed together by a clamp screw 158 running along axis 69.

Figure 18B:
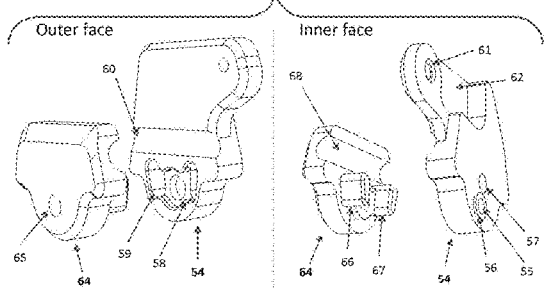
FIG. 18b shows an isolated view of components comprising one side of a swingarm assembly according to an embodiment of the disclosure.

FIG. 18*b* shows exploded views of swingarm assembly 53 shown in two different side perspectives: "outer face" and "inner face", providing a view of rail channel 68 located on outer clamp 64, and channel 60 located on swingarm 54. The perspective views allow a better view of the 'male' and 'female' guides which assist in aligning swingarm 54 and clamp 64 together. Swingarm 54 includes 'female' oriented pill-shaped guides 58 and 59, designed to receive complementary 'male' oriented and similarly pill-shaped guides 66 and 67 respectively located on clamp 64. FIG. 18*b* shows a recess 62 cut into swingarm 54 allowing clearance for lever 111 (see FIG. 6) as it rotates about pivot axis 164. A shoulder bolt 112 (see FIG. 18*a*) inserts into a threaded counterbore 61. Swingarm 54 shows a clamp screw hole 57 allowing access for clamp screw 158 (see FIG. 18*a*) which runs along axis 69 and culminates in threaded clamp hole 65 located on clamp 64. Pivot rim 56 acts to separate and create space between swingarm 54 and base member 150 (see FIG. 6). Swingarm assembly 53 pivots about a main pivot 196 (see FIG. 18*a*), along pivot axis 164. Another embodiment of swingarm assembly 53 may fixedly hold bicycle saddle rails below the axis line 69 which in effect would lower stack height. In another embodiment swingarm assembly 53 may hold saddle rails above or below the seatpost head 31 for the effect of lowering or raising stack height.

Figure 18C:
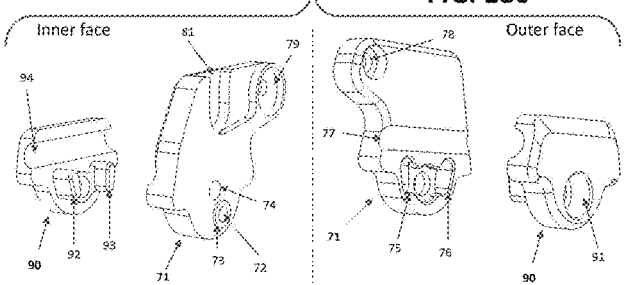
FIG. 18c shows an isolated view of components comprising another side of a swingarm assembly according to an embodiment of the disclosure.

Similarly, FIG. 18c shows exploded views of swingarm assembly 70 shown in two different side perspectives: "outer face" and "inner face", providing a view of rail channel 94 located on outer clamp 90, and channel 77 located on swingarm 71. The perspective views allow a better view of the 'male' and 'female' guides which assist in aligning swingarm 71 and clamp 90 together. Swingarm 71 includes 'female' oriented pill-shaped guides 75 and 76, designed to receive complementary 'male' oriented and similarly pill-shaped guides 92 and 93 respectively located on clamp 90. FIG. 18c shows a recess 81 cut into swingarm 71 allowing clearance for lever 111 (see FIG. 6) as it rotates about pivot axis 164. A shoulder bolt 112 (see FIG. 18a) inserts into a counterbore 78. Outer clamp 90 features counterbore 91 to receive clamp screw 158 (see FIG. 18a) which then passes through swingarm 71. Swingarm 71 features a clamp screw hole 74 allowing access for clamp screw 158 (see FIG. 18a) which runs along axis 69. Pivot rim 73 acts to separate and create space between swingarm 71 and base member 150 (see FIG. 6). A feature unique to this embodiment of swingarm 71 is spring barrel 79 which houses a torsion spring 115 (see FIG. 7), sandwiched between the swingarm 71 and opposing spring barrel 117 located within lever 111. Swingarm assembly 70 pivots about a main pivot 196 (see FIG. 18a), along pivot axis 164. Another embodiment of swingarm assembly 53 may fixedly hold bicycle saddle rails below the axis line 69 which in effect would lower stack height. In another embodiment swingarm assembly 53 may hold saddle rails above or below the seatpost head 31 for the effect of lowering or raising stack height.

Figure 13:
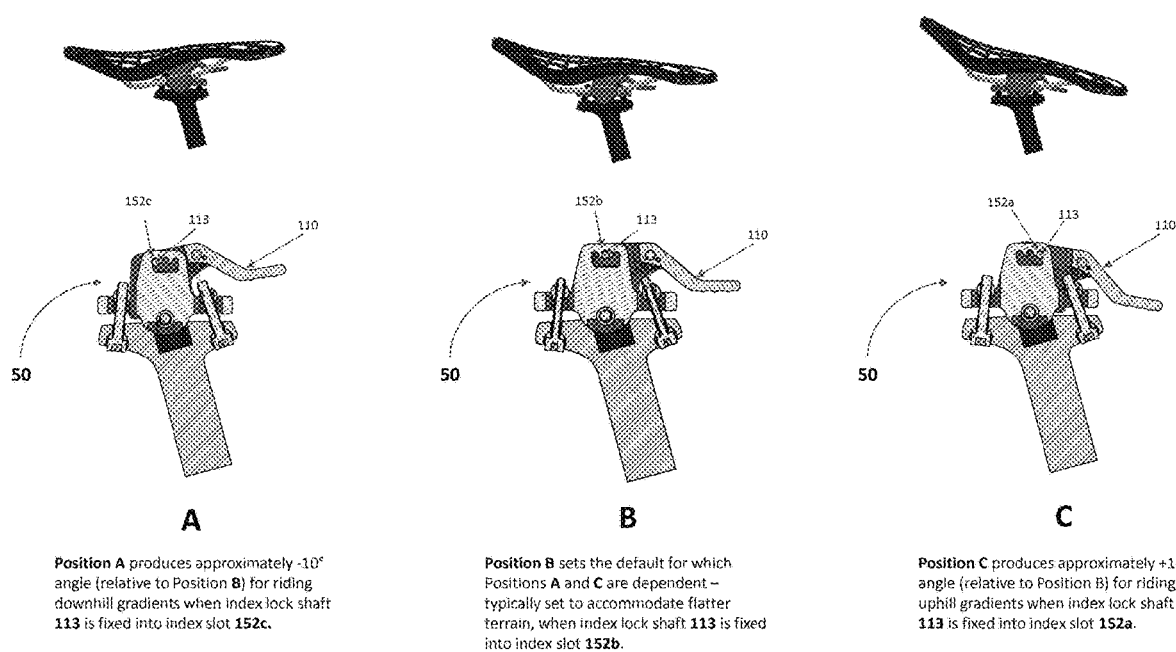
FIG. 13 shows cross section diagrams of a multi-position and orientation saddle attachment device locked in a variety of riding positions according to an embodiment of the disclosure.
Figure 19:
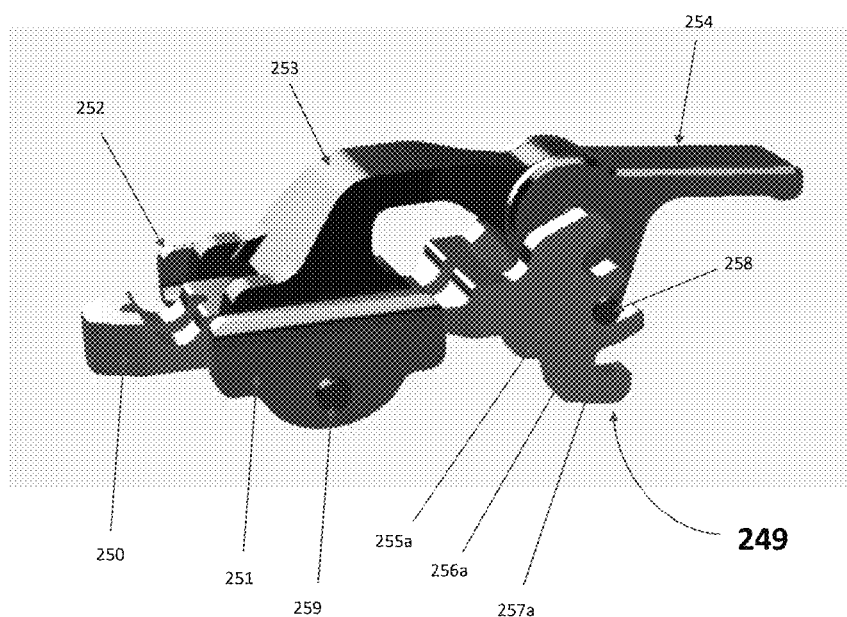
FIG. 19 shows a side view perspective of another embodiment of a multi-position and orientation saddle attachment device featuring posterior, and vertically oriented, indexes.

Turning to FIG. 19, there is shown a side view perspective of another embodiment of a multi-position and orientation saddle attachment device 249 marked by an embodiment of a base member 250, running horizontally, connected to a one-piece swingarm 253 and straddled by two rail clamps 251 and 252 fixed together by a main pivot clamp screw 259. The main feature of this embodiment of multi-position and orientation saddle attachment device 249 are two posterior-located 'wings' which mirror each other. The 'wings' feature a plurality of vertically oriented index slots which, in one embodiment as illustrated, shows 255a, 256a, and 257a on one side and 255b, 256b, and 257b on the other (see FIG. 19a). Positioning index lock 258 in one of the index slots vs. another will alter the ending geometry of an attached saddle position, similar to what is depicted in FIG. 13, whereby positioning index lock 258 into index slot 257b would yield similar results to FIG. 13 "A", and positioning index lock 258 into index slot 256b would yield similar results to FIG. 13 "B", and positioning index lock 258 into index slot 255b would yield similar results to FIG. 13 "C". It is worth noting that multi-position and orientation saddle attachment device 249 may be oriented with the lever positioned toward the rear or towards the front and is ambidextrous by design, similar to that of the preferred embodiment of a multi-position and orientation saddle attachment device 50 as explained and depicted in FIG. 21a and FIG. 21b. A lever 254, being attached to the swingarm 253, may be lifted upwards causing it to pivot about a pivot bolt 267 (see FIG. 19c) thus releasing index lock 258 from a sheathed position and ready to be relocated into any one of a plurality of index slots.

Figure 19A:
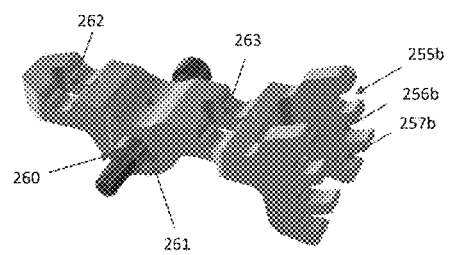
FIG. 19a shows a rear-view top perspective of a base member of a multi-position and orientation saddle attachment device of FIG. 19.

FIG. 19a shows a top view perspective of base member 249, featuring a bushing 260 inserted within pivot hole 261. In an embodiment of base member 249, there are fastener holes 262 and 263 used to attach the entire multi-position and orientation saddle attachment device 249 to a bicycle seatpost by way of mounting hardware (the latter two items are not shown in the illustration). FIG. 19a also shows a plurality of index slots 255b, 256b, and 257b.

Figure 19B:
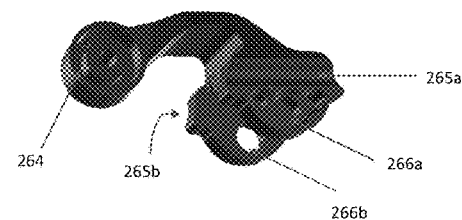
FIG. 19b shows a side view perspective of a swingarm component of multi-position and orientation saddle attachment device embodiment of FIG. 19.

Turning to FIG. 19b, there is shown a side view perspective of an embodiment of swingarm 253 showcasing rail channels 265a and 265b on opposing sides. The swingarm 253 attaches to the base member 250 when clamp screw 259 and bushing 260 are inserted into pivot holes 266a and 266b.

Turning to FIG. 19c, there is shown a top view perspective of a lever 254 outlining the locations of lever pivot bolt 267, and index lock shaft 258.

Turning to FIG. 19d, there are shown rail clamps 251 and 252, with clamp 251 showcasing rail channel 269a to hold a saddle rail in place, and a clamp hole 268 allowing the insertion of main pivot clamp screw 259 (see FIG. 19). Rail clamp 252 shows rail channel 269b which assists in holding a saddle rail (not shown) in place.

FIG. 20 shows an application flowchart outlining a typical use case scenario for the preferred multi-position and orientation saddle attachment device 50 (see FIGS. 1, 2 and 3) and given assumptions. Without want for redundancy, the flowchart depicts a scenario where a user rider may instantly adjust the preferred embodiment of multi-position and orientation saddle attachment device 50, whether in motion or not, to accommodate a change in trail or path grade: either inclining or declining in nature or remaining flat.

Figure 21A:
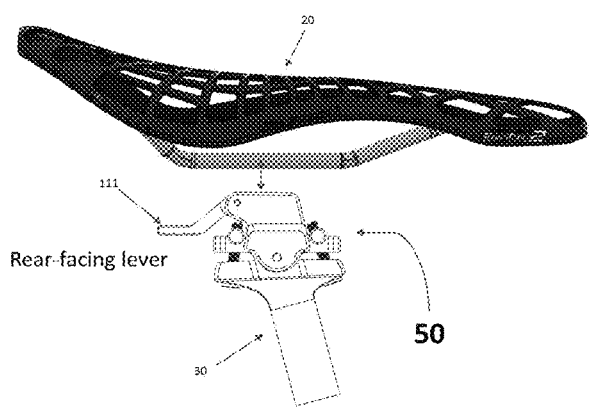
FIG. 21a shows a profile view of a multi-position and orientation saddle attachment device illustrating how it may be installed so that the lever portion is facing rearward, away from the direction of travel according to embodiments of the disclosure.
Figure 21B:
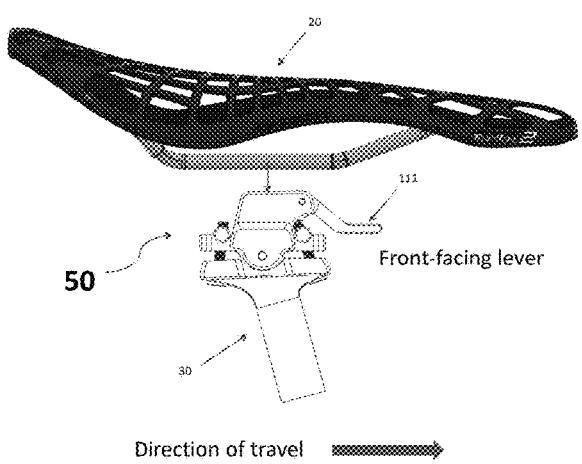
FIG. 21b shows a profile view of a multi-position and orientation saddle attachment device illustrating how it may be installed so that the lever portion is facing forward, along the direction of travel according to embodiments of the disclosure.

FIGS. 21a and 21b shows illustrations of the preferred embodiment of a multi-position and orientation saddle attachment device 50 in a partially exploded view to showcase the relationship with a saddle 20 and seatpost 30, installed and oriented in two different ways showcasing a novel concept whereby it may be positioned for use in different ways, depending on a user's preference. FIG. 21a depicts multi-position and orientation saddle attachment device 50 with a rear-facing lever 111, tucked underneath the rear seating portion of the saddle 20. Conversely, FIG. 21b shows the multi-position and orientation saddle attachment device 50 with the lever 111 facing forwards, nestled underneath the front-end nose of the saddle 20.

Figure 22:
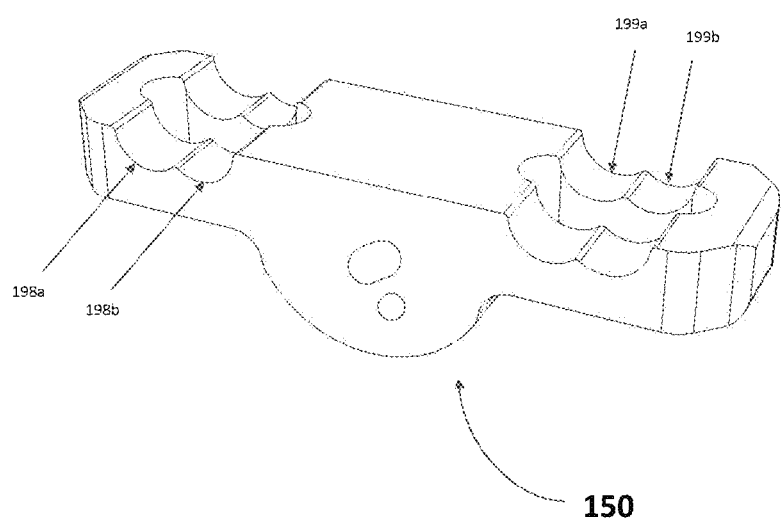
FIG. 22 shows a top perspective cross-sectional view (minus the bridge portion) of another embodiment of a base member component featuring scalloped nut cradles.

Turning to FIG. 22 is another embodiment of base member 150 showing only the lower portion missing the asymmetrical bridge merely for the purpose of focusing on different hardware housing. In the embodiment of base member 150 as illustrated, there are 4 scalloped nut cradles 198a, 198b, 199a, 199b, situated on opposite sides of the bridge portion of base member 150. The scalloped nut cradles 198a, 198b, 199a, and 199b, serve the purpose of allowing a wider range of compatibility for the multi-position and orientation saddle attachment device 50. The scalloped design allow for a cylindrical nuts to be placed in different arrangements to correspond with different widths of seatpost heads found among different seatposts. For example, a user may install mounting bolts 201 and 204 configured to cylinder nuts 202 and 205 respectively, as seen in FIG. 5, with the option to choose from a plurality of positions to correspond with a given seatpost. For example, if a seatpost features a short seatpost head, the user may elect to choose install mounting hardware to coincide with nut cradle 198b on one side, and nut cradle 199a on the other side of base member 50. Relatedly, if a user has a seatpost with a substantially larger seatpost head, he may elect to use the outer cradles such as nut cradle 198*a* on one side, and nut cradle 199*b* on the other side of base member 50.

ADDITIONAL EMBODIMENTS

Embodiments include a multi-position and orientation bicycle saddle attachment device for attaching a saddle to a seatpost, the saddle attachment device comprising a base component to secure a swingarm assembly to a seatpost comprising: a bearing surface constructed to correspond to a seatpost head which defines a rotation perimeter centered about an axis providing a first or "primary" rotation adjustment; a cavity configured with index slots to provide assistance in repositioning a saddle into a plurality of positions; a swingarm assembly configured to hold a saddle in place by its rails allowing fore and aft slidable adjustment and providing a second or "secondary" rotation adjustment about a central pivot axis allowing a method to reposition a saddle into a plurality of positions, comprising: a first and second inner swingarm member, each swingarm configured to slidably and pivotally engage with, and hold, a saddle rail in place; a first and second outer clamp member, each clamp member configured to slidably and pivotally engage with, and hold, a saddle rail in place, complementing the swingarms; mounting hardware configured to securely attach the multi-position and orientation bicycle saddle attachment device to a seatpost assembly, together with a bicycle saddle, comprising: at least a first fastener; at least a first nut.

In another embodiment of a multi-position and orientation saddle attachment device, there may include a lever assembly to selectively locate and relocate the swingarm assembly, comprising: a lever to control movement of a swingarm assembly, comprising: a locking shaft configured to interface with a base component to provide a positive coupling; a biasing member such as a torsion spring to provide resistance and assistance in locking and locking the locking shaft.

In another embodiment of a multi-position and orientation saddle attachment device, there may include a second fastener and a second nut.

In another embodiment of a multi-position and orientation saddle attachment device, there may include the ability for it to operate fully independent of a seatpost's substantially vertically-oriented movement.

In another embodiment of a multi-position and orientation saddle attachment device, there may include the ability for the device to be configured to retrofit across a wide variety of seatposts.

In another embodiment of a multi-position and orientation saddle attachment device, there may include the ability for the device to be configured to retrofit across a wide variety of saddles.

In another embodiment of a multi-position and orientation saddle attachment device, there may include the ability for the device to be operated by a cable-actuated lever located on a bicycle handlebar.

In another embodiment of a multi-position and orientation saddle attachment device, there may include the ability for the device to be operated wirelessly with the assistance of a handlebar mounted device and wireless signals.

In another embodiment of a multi-position and orientation saddle attachment device, it may be included as one part of the assembly of a seatpost.

In another embodiment of a multi-position and orientation saddle attachment device, it may be included as one part of the assembly of a dropper seatpost.

The invention claimed is:

1. A saddle attachment device, comprising:
 a base member including:
  a lower surface adapted to engage with a seat post assembly,
  a plurality of index slots;
 at least one attachment member assembly, the attachment member assembly including:
  at least one attachment member, including a recess adapted to partially receive a saddle rail;
  first and second clamps, each including a recess adapted to partially receive a saddle rail; and
  a fastener for coupling at least one attachment member to said first and second clamps; and
 a locking assembly including
  a locking shaft, and
  a rotatable biasing member;
 wherein the biasing member of the locking assembly is configured to bias the locking shaft of the locking assembly to engage at least one of the plurality of index slots of the base member, thereby fixing the rotatable relationship between the base member and the attachment member assembly; and
 wherein the locking shaft of the locking assembly is configured to be displaced in a first direction upon the application of a biasing force on the biasing member, whereupon the base member and the attachment member assembly are rotatable in relation to each other.

2. The device of claim 1, wherein the base member is removably attachable to a seat post.

3. The device of claim 1, wherein the attachment member assembly is adapted to receive a seat, and the seat is slidably engaged with the attachment member assembly.

4. The device of claim 1, wherein the locking assembly comprises a lever, wherein the locking shaft is engaged, locking the attachment member assembly and base member together, when the lever is in a first position, and wherein the locking shaft is disengaged, permitting rotation of the attachment assembly in relation to base member, when the lever is deflected to a second position.

5. The device of claim 4, wherein the lever comprises a surface adapted to be deflected by a user's hand, thereby rotatably deflecting the lever.

6. The device of claim 4, wherein the rotatable biasing member is biased to deflect the lever toward the first position.

7. The device of claim 1, wherein the attachment member assembly and the base member are adapted to rotate in relation to each other on application of force by the hand of a user when the locking assembly unlocks the locking shaft.

8. The device of claim 1, wherein the locking assembly locks the locking shaft at positions defined by the index slots.

9. The device of claim 8, wherein the base member comprises an asymmetrical bridge having a cutaway adapted to interface with the attachment member assembly, and the plurality of index slots is defined by a plurality of notches in the asymmetrical bridge.

10. The device of claim 8, wherein the base member comprises a pair of wing members, the wing members extending from the base member and substantially parallel to each other, and adapted to receive the attachment member assembly therebetween, the plurality of index slots being defined by a plurality of notches in the wing members.

11. The device of claim 1, wherein the attachment member assembly comprises a first attachment member and a second attachment member, the first and second attachment members disposed generally parallel and spaced apart with the locking assembly and base member disposed therebetween.

12. The device of claim 11, wherein the first and second attachment members comprise a first clamp and second clamp respectively, each clamp including a recess adapted to partially receive a saddle rail for attaching a seat to the attachment member assembly.

13. The device of claim 12, wherein each of the base member, first attachment member, second attachment member, first clamp and second clamp comprise a transverse through-hole for receiving a transverse fastener, the transverse fastener fixedly securing the first clamp to the first attachment member, and the second clamp to the second attachment member, and rotatably securing the first and second attachment members to the base member.

14. The device of claim 13, wherein the through-hole of the base member is shaped to permit the attachment member assembly to be rotated from a first position to a second position with respect to the base member by permitting the transverse fastener to slidably travel within the through-hole in a generally perpendicular direction to the length of the transverse fastener.

15. The device of claim 14, wherein the base member further comprises a second transverse through-hole, and the attachment member assembly further comprises a pivot member extending from the first attachment member to the second attachment member through said second transverse through-hole, the attachment member assembly being rotatable about said pivot member with respect to the base member.

16. The device of claim 1, wherein the attachment member assembly comprises a single-piece attachment member.

17. The device of claim 2, wherein the base member comprises a flange extending laterally therefrom, the flange having a through-hole adapted to receive a fastener for attaching the base member to a seat post.

18. The device of claim 17, wherein the flange comprises a cradle portion intersecting the through-hole and adapted to receive a cylindrical nut, the cylindrical nut having a cavity extending through its curved surface adapted to receive the fastener therethrough for securing said fastener.

* * * * *